(12) United States Patent
Simionescu et al.

(10) Patent No.: US 10,078,460 B2
(45) Date of Patent: Sep. 18, 2018

(54) MEMORY CONTROLLER UTILIZING SCATTER GATHER LIST TECHNIQUES

(71) Applicant: Avago Technologies General IP (Singapore) Pte. Ltd., Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 30 days.

(21) Appl. No.: 15/335,039

(22) Filed: Oct. 26, 2016

(65) Prior Publication Data

US 2018/0113635 A1    Apr. 26, 2018

Related U.S. Application Data

(60) Provisional application No. 62/410,752, filed on Oct. 20, 2016.

(51) Int. Cl.
*G06F 12/00* (2006.01)
*G06F 3/06* (2006.01)
*G06F 12/0875* (2016.01)

(52) U.S. Cl.
CPC ........... *G06F 3/0619* (2013.01); *G06F 3/065* (2013.01); *G06F 3/067* (2013.01); *G06F 12/0875* (2013.01); *G06F 2212/452* (2013.01)

(58) Field of Classification Search
CPC ........ G06F 3/0619; G06F 3/065; G06F 3/067; G06F 12/0875
See application file for complete search history.

(56) References Cited

U.S. PATENT DOCUMENTS

| | | |
|---|---|---|
| 5,931,920 A | 8/1999 | Ghaffari et al. |
| 6,640,290 B1 | 10/2003 | Forin et al. |
| 7,730,239 B2 | 6/2010 | Chang et al. |
| 8,266,116 B2 | 9/2012 | Agarwal et al. |
| 9,134,909 B2 | 9/2015 | Padia et al. |
| 9,280,609 B2 | 3/2016 | Liu |
| 2004/0128463 A1 | 7/2004 | Kim et al. |
| 2007/0156997 A1 | 7/2007 | Boule et al. |
| 2013/0326154 A1 | 12/2013 | Haswell |

*Primary Examiner* — Midys Rojas
(74) *Attorney, Agent, or Firm* — Sheridan Ross P.C.

(57) ABSTRACT

A system and method for efficient cache buffering are provided. The disclosed method includes receiving a host command from a host, extracting command information from the host command, determining an Input/Output (I/O) action to be taken in connection with the host command, identifying a particular memory module from among a plurality of memory modules to execute the I/O action, generating an accelerated I/O message for transmission to the particular memory module, the accelerated I/O message comprising at least one Internal Scatter Gather List (ISGL) having a plurality of Scatter Gather Extents (SGEs) that enable the particular memory module to execute the I/O action solely based on the at least one ISGL, and transmitting the accelerated I/O message to the particular memory module.

20 Claims, 6 Drawing Sheets

| | | | |
|---|---|---|---|
| 0x00 | Function | Opcode | FW Trap | Parent LMID |
| 0x04 | MSG Flags | Timer Wheel Bucket | | Next LMID |
| 0x08 | DEV Handle | | | SAS MID |
| 0x0C | MPI Flags | | SGL 1 Offset | SGL 0 Offset |
| 0X10 | Control Flags | | | Skip Count |
| 0X14 | Data Length | | | |
| 0X18 | ISGL or RSL or HSGL 1 | | | ISGL or RSGL or HSGL 0 |
| 0X1C | Reserved | | | Encryption Key Index |
| 0X20 | EEDP Block Size | | | EEDP Flags |
| 0X24 | Secondary Ref Tag | | | |
| 0X28 | Secondary App Tag Mask | | | Secondary App Tag |
| 0X2C | Reserved | | MSB | |
| 0X30 | - - - - - LBA - - - - - LSB | | | |
| 0X34 | Primary Ref Tag | | | |
| 0X38 | Primary App Tag Mask | | | Primary App Tag |
| 0X3C | Reserved | | | Number Of Blocks |

MEMORY CONTROLLER UTILIZING SCATTER GATHER LIST TECHNIQUES

CROSS-REFERENCE TO RELATED APPLICATIONS

This Non-Provisional Patent Application claims the benefit of U.S. Provisional Patent Application No. 62/410,752, filed Oct. 20, 2016, the entire disclosure of which is hereby incorporated herein by reference.

FIELD OF THE DISCLOSURE

The present disclosure is generally directed toward computer memory.

BACKGROUND

Currently in systems designed to support IEEE Scatter Gather Lists (SGLs), the Input/Output (I/O) to a backend memory controller requires a frame with SGL buffers in an IEEE format. When the buffer sizes are small (say 4 KB), then the number of SGLs will be very high and many chain frames need to be allocated to accommodate all the Scatter Gather Extents (SGEs).

Hardware accelerated write buffering solutions work on small buffers (e.g., 4 KB) and use SGLs to represent the buffers rather than the IEEE SGLS. This would greatly reduce the space requirements to represent all the buffers as well as provide additional flexibility to represent snapshot of a cache at any point of time. Problematically, it would be very inefficient to convert the buffer segment IDs from the SGLs and into IEEE SGLs to communicate with the backend memory controller.

Furthermore, firmware needs to fill fake address(es) in SGEs for performing bitmap data discarding reads. It is much more advantageous if the backend memory controller recognizes these fake addresses and in those cases does not transfer data at all.

Further still, in RAID 5/6 processing there are use cases where some buffers are dirty (BS) and others, like Alias/Temporary buffers are used to read the old data from the drives. It is useful in those cases to have a framework where backend memory controller can identify and skip reading over the dirty buffers such that the RAID 5/6 algorithms can avoid unnecessary frames and buffers allocation for transferring of such data that is not needed and has to be discarded.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, embodiments of the present disclosure aim at providing a memory controller capable of leveraging the versatility provided by an efficient SGL to implement effective transfer and data transformation methods essential to accelerating cache and RAID algorithms.

In some embodiments, a new frame format is introduced to represent the SGLs and the SGL offsets where the data buffers are located. The frame size, in some embodiments, can be limited to 64 Bytes to make it more space efficient by ensuring that it contains all the relevant information for the controller to perform the I/O operation.

In some embodiments, the controller can be configured to interpret SKIP type, BS type, Filler type, Missing ARM type and other special SGEs. The controller may also be configured to perform bitmap reads. When the controller encounters a SKIP type SGE it will skip transfer the data for those many blocks equivalent to the skip count. It may also be possible to configure the controller to issue optimized read commands like Read all buffers, Read only filler buffers, Read only dirty buffers etc., which are of great advantage for RAID 5/6 flush processing. The controller could also use other specialized SGE formats to perform several data transformations, like encryption, compression, DIF/DIX, etc. Similar methods of data transfer/transformation that are illustrated in the current embodiments extend to data manipulation cases, like (host) memory to/from (internal) memory DMA transfers.

With reference to FIGS. 1-6, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of caching or buffering scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

Figure 1:
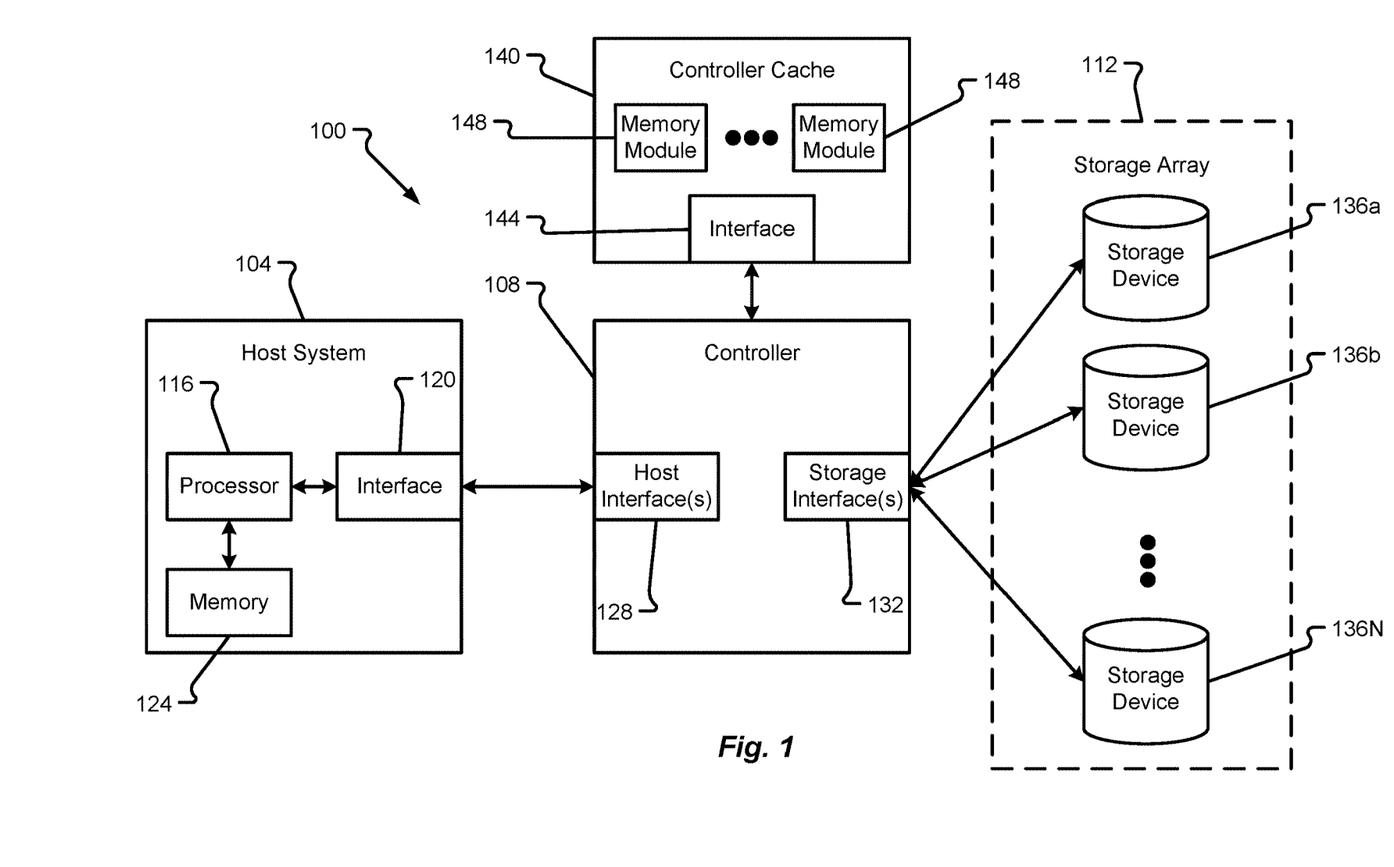
FIG. 1 is a block diagram depicting a computing system in accordance with at least some embodiments of the present disclosure.

With reference now to FIG. 1, additional details of a computing system 100 capable of implementing data transfers and transformations will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.). The controller 108, in some embodiments, may be referred to as a "backend I/O controller", an "I/O controller engine", a "backend controller", or simply a "controller" without departing from the scope of the present disclosure.

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block.

Higher level RAID schemes can further segment the data into bits, bytes, or blocks for storage across multiple storage devices 136a-N. One or more of the storage devices 136a-N may also be used to store error correction or parity information. RAID 5, for example, utilizes the combination of striping and parity techniques. In case of RAID 5, the flow of data is split into the blocks of a certain size (block size) which are then written onto the member storage devices 136a-N in turn. In each row, one of the devices is assigned to store a certain checksum, a so called parity function, which is calculated based on the data from other member disks in the row. In case of a single disk failure, the missing data can be calculated using the parity. In such a way fault tolerance is provided.

A minimum of three storage devices/disks is used for RAID 5. Theoretically, the maximum number of the storage devices/disks is not limited, but in practice, it is needed to take into account the controller capacity in case of a hardware RAID. The capacity of the array is (N−1) times the size of the smallest member storage device/disk for the array of N storage devices/disks. Thus, the capacity of one storage device/disk is used to store the parity function data to provide fault tolerance.

Read speed in RAID 5 is the similar to that of RAID 0 provided that the number of storage devices/disks is the same. However, due to the fact that it is useless to read the parity data, the read speed is just (N−1) times faster but not N times as in RAID 0.

RAID 6 uses both striping and parity techniques, but unlike RAID 5, the RAID 6 architecture utilizes two independent parity functions which are then written to two member storage devices/disks. Typically, one of these parity functions is the same as in RAID 5 (e.g., an XOR function), while the second is more complex. The parity data helps to recover data in case of simultaneous failure of two member disks.

A minimum of four storage devices/disks are used to create RAID 6. The capacity of the array is (N−2) times the size of the smallest member storage device/disk for the array of N storage devices/disks. Read speed is (N−2) times faster than in case of a single storage device disk—two disks in the row hold a parity which is useless to read. Such read speed values are roughly the same as in RAID 5. There is substantially no performance increase as to the write speed in RAID 6, because every new write requires a recalculation and update of two different parity blocks. RAID 6 is somewhat expensive storage option. However, when large and reliable storage is desired, then RAID 6 is one of the best choices due to its ability to protect data if two disk failures occur.

As mentioned above, unlike RAID 0/1, RAID 5/6 would have one or two parity arms for redundancy. The parity P arm for RAID 5/6 is an XOR of all the data arms and Q is a co-efficient calculated again from all the arms (e.g., Galois co-efficient). When an arm is not present or a part of data from any arm is not available then it can be regenerated from the remaining data and parity arms. This redundancy level for RAID 5 is 1 and for RAID 6 is 2.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 or a smaller number of cache memory modules 148. The memory modules 148 may correspond to flash memory, RAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
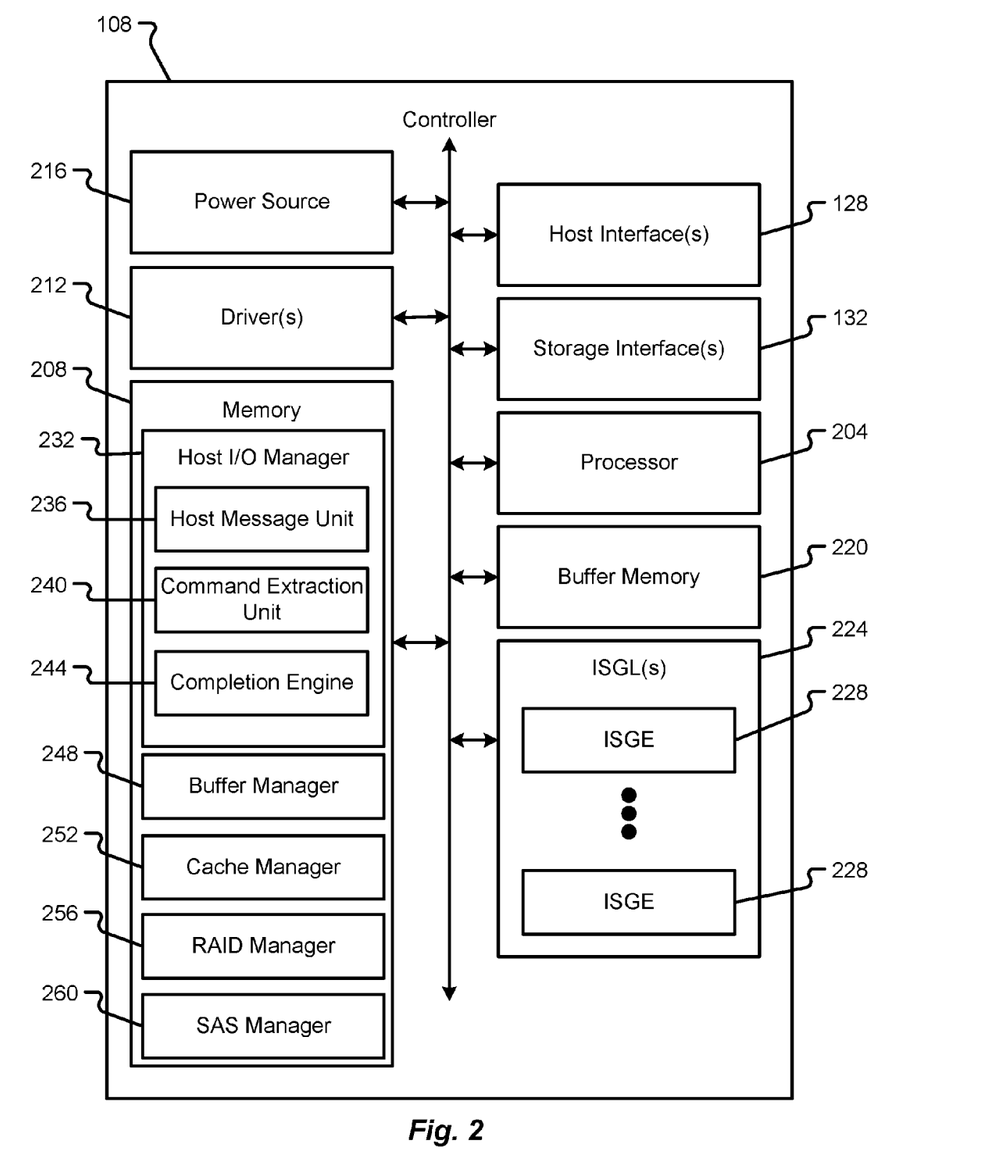
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, the processor 204 may utilize buffer memory 220 and/or one or more ISGLs 224 (or ISGEs 228 contained therein) to assist with executing read and/or write operations (or other types of memory control operations). The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI (Message Passing Interface) protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. Additional details of an LMID will be described in connection with FIG. 4.

The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands. The cache manager 252 may also enable the processor 204 to communicate with the controller cache 140 and leverage the memory modules 148 of the controller cache 140. The cache manager 252 may also manage the creation and lifecycle of cache frame anchors for rows 228, cache frame anchors for strips 230, and/or ISGLs 224. As an example, as caching functions are executed, one or more data structures 228, 230 may be created or utilized to facilitate the caching function.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if not caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
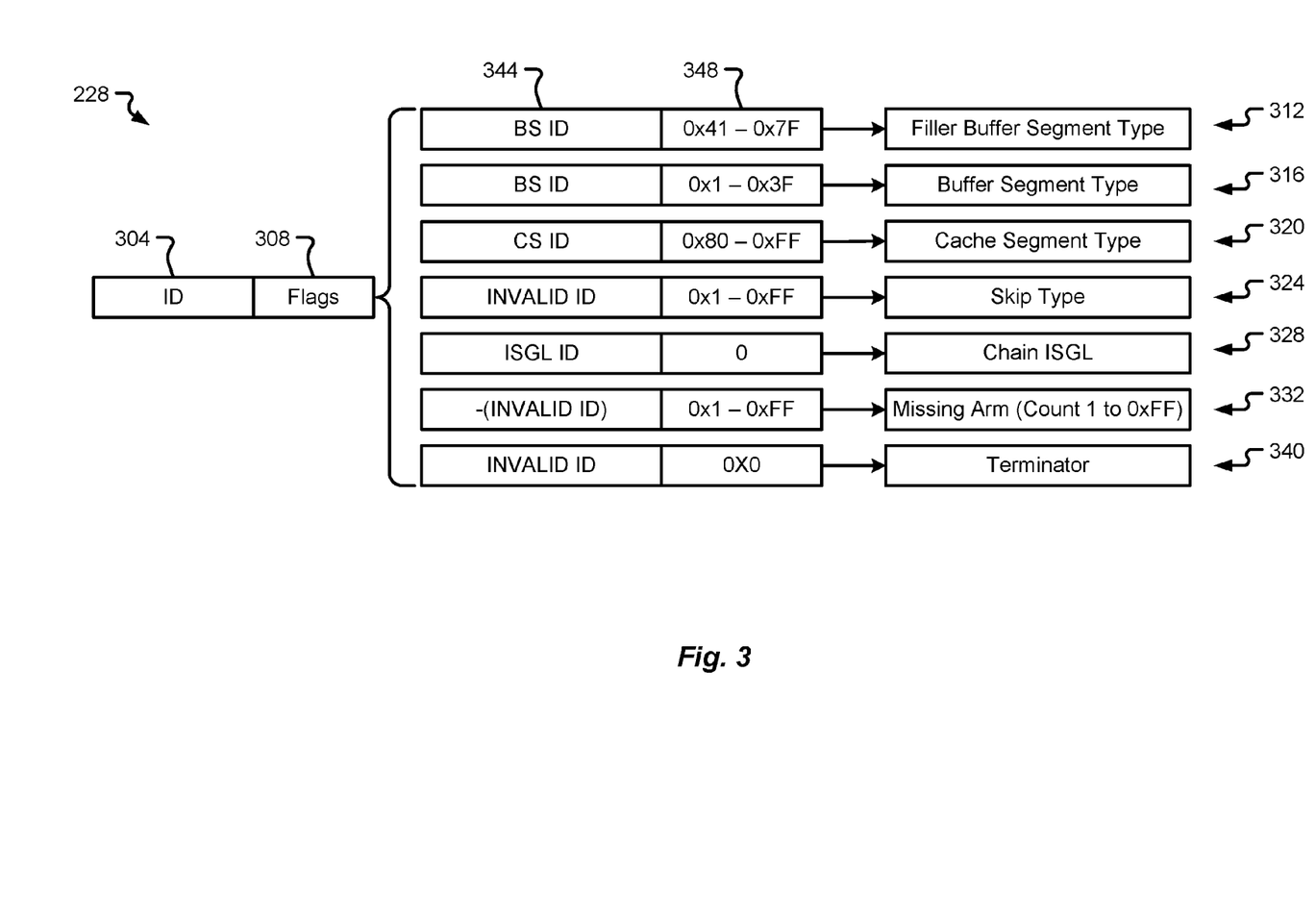
FIG. 3 is a block diagram depicting additional details of an ISGL in accordance with at least some embodiments of the present disclosure.

With reference now to FIG. 3, additional details of an ISGE 228, which may also be referred to as a SGE, will be described in accordance with at least some embodiments of the present disclosure. The ISGE 228 is shown to include an ID field 304 and a flags field 308. In some embodiments, the ISGE 228 contains only 4 bytes of metadata as compared to traditional SGEs that contain 16 bytes of data. Use of this size of ISGE 228 allows for data to be better condensed/compressed. Furthermore, as will be described herein, a BS ID can be converted to a memory address (e.g., address in buffer memory) to further help decrease processing time and memory utilization.

The ID field 304 may be used to provide information that identifies (e.g., uniquely identifies) the ISGE 228 among other ISGEs used by the controller 108. In some embodiments, the ID field 304 may contain an alphanumeric string that identifies the ISGE 228, a location in memory with the ISGE 228 is stored, or the like.

The flags field 308 is used to store and describe the various types of flags that are used by the controller 108 to determine processing for the ISGE 228. In particular, the flags field may contain information that identifies one or more of the following properties of the ISGE 228: filler buffer segment type information 312, buffer segment type information 316, cache segment type information 320, skip type information 324, chain ISGL information 328, missing arm information 332, and terminator information 340. Each type of flag may contain an identifier field 344 and an addressing or range field 348. The identifier field may contain information that specifically identifies the type of flag or information related to the flag (e.g., a Buffer Segment (BS) ID, a Cache Segment (CS) ID, a chain ID, a missing arm (if the ISGE 228 and/or ISGL 224 belongs to a chain), etc. Sometimes the information in the identifier field 344 may be invalid if there is no data needed to identify (e.g., if a skip type flag or terminator flag is provided in the flag field 308). In an even more specific, but non-limiting, example, the ID field 344 may contain a starting address for the ISGE 228 (e.g., a starting address for the buffer). By using this type of data organization and by incrementing from one ISGE 228 to the next, it becomes possible for the controller 108 to describe which addresses in memory is traverses to complete a particular I/O command.

In some embodiments, the filler buffer segment type information 312 indicates if there are gaps in data that have been filled by a buffer segment. The buffer segment type field 316 indicates whether or not the ISGE 228 if of a buffer segment type of ISGE. The cache segment type field 320 indicates whether or not the ISGE 228 is of a cache segment type. The skip type fields 324, 336 indicate whether the ISGE 228 should be skipped or is otherwise not in use. The chain ISGL information 328 indicates whether the ISGE 228 belongs to a chain of ISGEs 228 and information that can be used to traverse a chain of ISGEs 228. The field 328 may also contain information related to previous or next ISGL in the chain to enable the controller 108 to traverse the chain in connection with executing an I/O command. The field 328 may also provide an indication that the end of a chain has been reached.

A buffer filler segment is particularly useful because it affords the controller 108 with the ability to process a single I/O faster than in prior art memory solutions. Specifically, the size of a tolerable gap for a filler is configurable (e.g., one sector up to 64 sectors). When a cache manager 252, for example, receives an ISGL 224, the cache manager 252 will know how to operate on a cache buffer based on the information contained in the ISGL 224. The cache manager 252 can also operate on multiple ISGEs by traversing the chain of ISGEs 228 based on information contained in the chain ISGL field 328.

Figure 4:
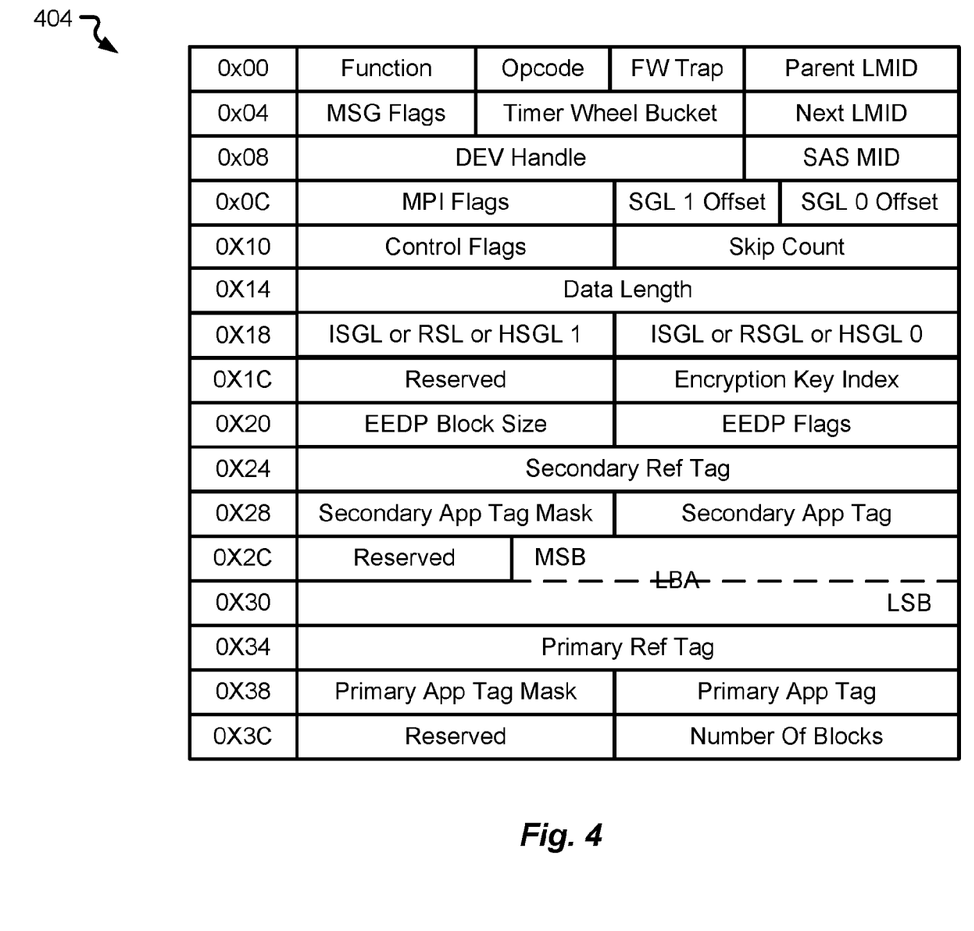
FIG. 4 is a block diagram depicting additional details of a data structure used in accordance with at least some embodiments of the present disclosure.

With reference now to FIG. 4, additional details of an LMID 404 will be described in accordance with at least some embodiments of the present disclosure. In some embodiments, the LMID 404 may also be referred to as an accelerated I/O message in that the LMID enables acceleration of I/O processing. In some embodiments, the LMID 404 is issued to by one memory 208 component to another. For instance, the host I/O manager 232 may issue an LMID 404 to a buffer manager 248, a cache manager 252, a RAID manager 256, or a SAS manager 260. The component that receives the LMID 404 may be enabled to perform the I/O command identified by the LMID 404 based on the fields defined within the LMID 404.

While the LMID 404 is shown to include a number of fields, some fields will be described in further detail. One illustrative field of an LMID 404 is the parent LMID field. The parent LMID field may store or convey the frame ID of the parent command that initiated the I/O command.

The opcode field may contain information that identifies the type of LMID 404 being issued. For instance, the opcode field may indicate that the LMID 404 is for a WRITE command, a READ_ALL command, a READ_FILLER command, a READ_BS command, or the like. The WRITE command identified in the opcode causes the receiving component to perform a write with the source as the SGL buffers (BS and filler buffers together). The READ_ALL command causes the receiving component to perform a read with the destination as the SGL buffers (BS and filler buffers together). The receiving component will skip the read with a skip type SGE is encountered. The READ_FILLER command causes the receiving component to perform a read with the destination of the SGL buffers, but only for filler buffers. The READ_BS command causes the receiving component to perform a read with the destination as the SGL buffers, but only for the BS buffers.

The function field may contain information that describes the I/O command to be performed. Specifically, the function field may describe the I/O command to be performed by the receiving component (e.g., read, write, etc.). The function may be a generic description of the function that is further defined in the opcode field.

The Next LMID field may contain information that conveys if the receiving component needs to pend or delay the I/O command. If the receiving component needs to pend or delay the I/O command, then the Next LMID field will contain the frame ID of the I/O command that needs to be pended/delayed. the frame ID of the parent command that initiated the I/O command.

The timer wheel bucket may contain timing information. Specifically, the timer wheel bucket may contain information for each I/O command. In some embodiments, each timer wheel bucket can time 255 I/O commands started within a given time window. This field can be designed to store the corresponding timer bucket which can be used in case of error.

The MSG Flags field may contain any information related to flags for an I/O command. More specifically, the MSG Flags field may describe any I/O message-specific flags. The flags may be stored as single bits or as a collection of bits or an alphanumeric string describing the flag information.

The DEV handle field may contain information related to a device handle. As an example, the DEV handle field may describe an I/O controller device handle for a specific device (e.g., host system 104) that issued an I/O command.

The SGL offset fields may contain data describing the desired or necessary offset for a particular SGL 224. In some embodiments, the SGL 0 Offset and the SGL 1 Offset indicate an SGL offset within the SGL for data and metadata (in case of EEDP), respectively.

The skip count field may contain data related to a number of blocks to be skipped. For instance, the skip count field may define a number of blocks to be skipped with respect to a host buffer.

The data length field may contain information describing the length of an I/O command. The data length may be described in bits, bytes, blocks, number of ISGLs spanned, size of memory occupied, etc.

The ISGL 1 and ISGL 0 fields may contain an identifier of one or many ISGLs 224. In some embodiments, the ISGL 0 field contains a buffer segment ID where the transfer of data needs to be done (either to or from) for the data specifically. The ISGL 1 field contains a buffer segment ID where the transfer of data needs to be done for the metadata specifically.

The Encryption Key Index field, EEDP flags, EEDP block Size, secondary ref tag, secondary app tag, secondary app tag mask, primary ref tag, primary app tag, and primary app tag mask may all correspond to fields used for EEDP handling. In some embodiments, the Encryption Key Index field provides an identifier of the encryption key index used for EEDP handling, whereas the EEDP flags and EEDP block size fields describe information related to the EEDP.

The LBA field may contain an address, range of addresses, or set of addresses (e.g., a non-continuous set of addresses) that are impacted by the I/O command. In some embodiments, the LBA field may include an identifier of a start LBA for an I/O command. The LBA field may also describe a MSB or LSB of the I/O command. Any type of addressing scheme can be used to describe the addresses in the LBA field.

The number of blocks field may contain information that represents the number of blocks of transfer to be done for a particular I/O command. The number of blocks field may be related to or separate from the data length field. The number of blocks field may be specifically used for describing the number of blocks to be transferred during execution of the I/O command represented by the LMID 404.

Figure 5:
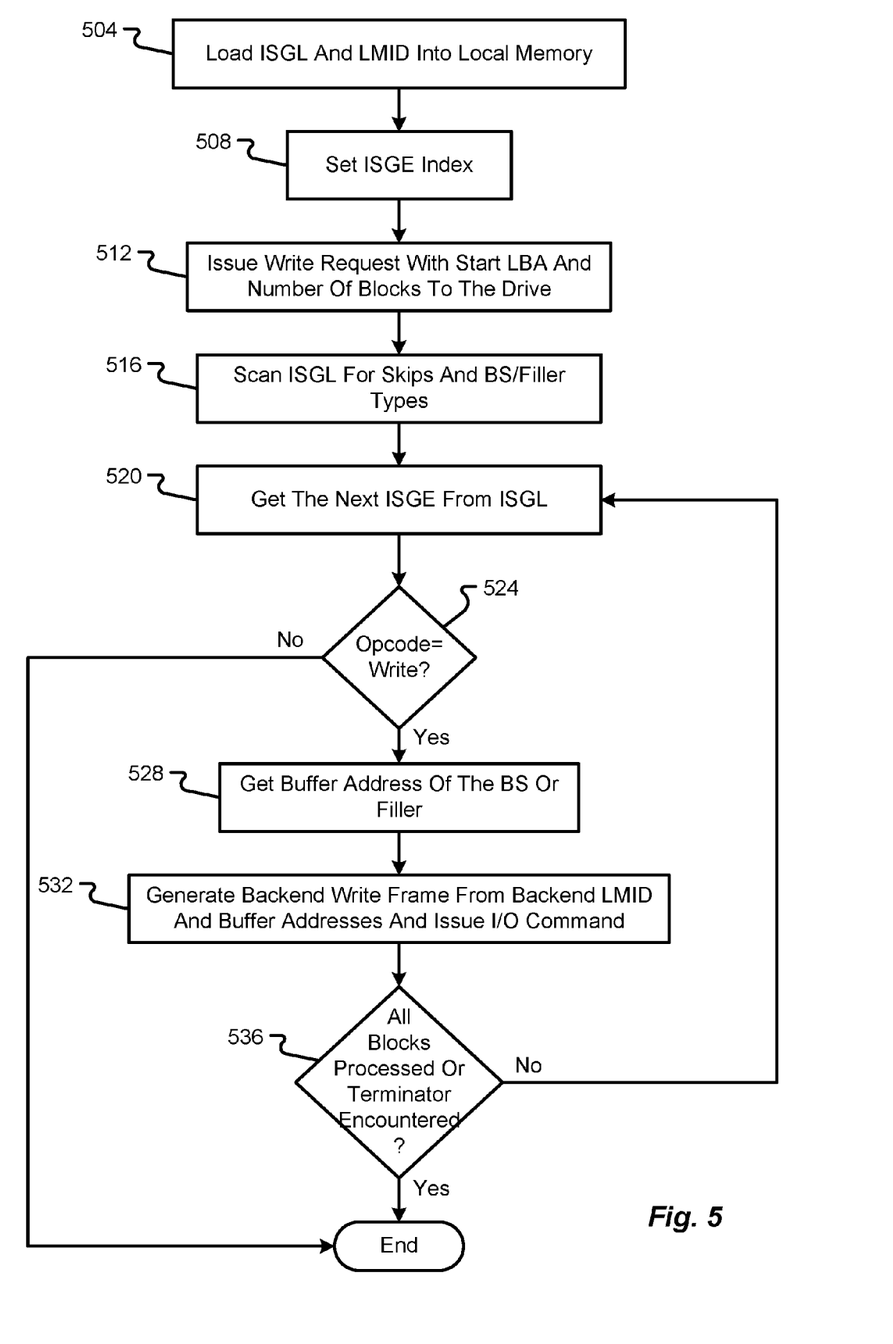
FIG. 5 is a flow diagram depicting a method of write processing in accordance with at least some embodiments of the present disclosure.

With reference now to FIG. 5, a method of performing write command processing with a valid ISGL 224 will be described in accordance with at least some embodiments of the present disclosure. The I/O controller (or the component within the controller 108) may receive the LMID and begin the process by loading the ISGL 224 and LMID 404 into its local memory (step 504).

The method proceeds with the controller 108 (or component within the controller 108) scanning the ISGL 224. Specifically, each ISGE 228 within the ISGL 228 is scanned one at a time. This scanning process begins by setting an ISGE index (step 508) and then issuing a write request with the start LBA and the number of blocks to the drive (step 512). This information (e.g., LBA information and number of blocks) is contained entirely within the LMID 404. The controller 108 (or its component) scans the ISGL 224 for skips and BS/filler types (step 516). If the controller encounters a skip type ISGE 228, the controller will ignore that ISGE 228. The controller will also interpret the skip count number of blocks and not needing to be written to the memory device.

The method will proceed with the controller getting the next ISGE 228 from the ISGL 224 (step 520) and determining if the opcode indicate a write command (step 524). If the query of step 520 is answered negatively, the method ends. If the query is answered positively, the method proceeds with the controller getting the buffer address of the BS or Filler buffer segment (step 528). The controller then generates a backend write frame from the LMID 404 and buffer addresses that will be used to complete the backend write command. Thereafter, the controller 108 issues the write command (step 532). In some embodiments, if the ISGE 228 was a skip type, then the buffer address contained within the ISGE would translate to a fake address, which is not mapped, thereby resulting in no data transfer.

The method will repeat itself until such time that all blocks in the LMID 404 have been processed or a terminator type buffer segment has been encountered (step 536). If additional blocks need processing, then the method returns to step 520. In some embodiments, the controller accumulates contiguous filler or BS type ISGEs 228 and issues them as a single write I/O command. If not additional blocks need processing or the terminator type ISGE has been encountered, the method ends.

Figure 6:
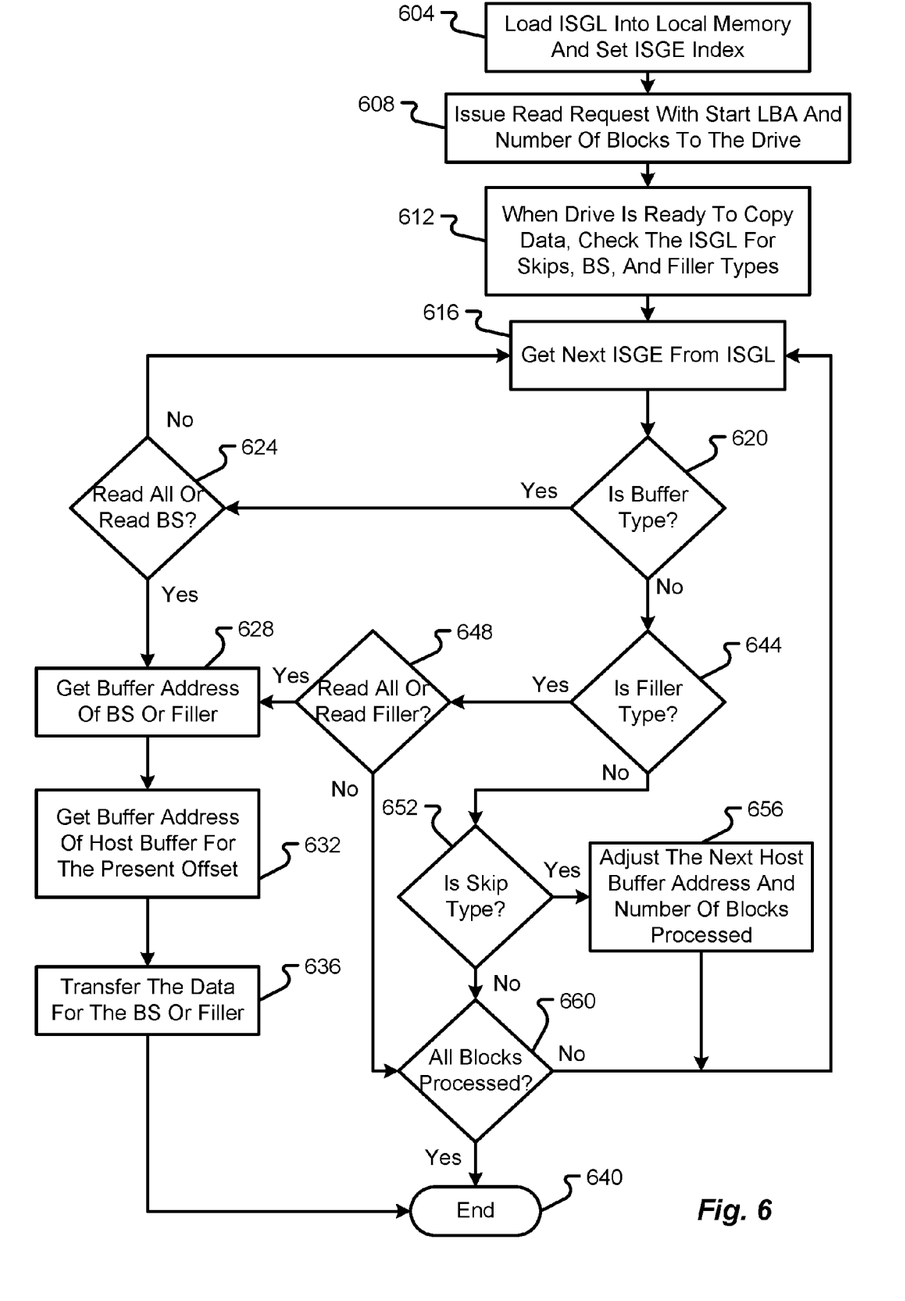
FIG. 6 is a flow diagram depicting a method of read processing in accordance with at least some embodiments of the present disclosure.

With reference now to FIG. 6, a method of performing read command processing with a valid ISGL 224 will be described in accordance with at least some embodiments of the present disclosure. The method begins when the controller 108 (or its component) receives the LMID 404, loads the LMID 404 and the ISGL 224 into its local memory for processing (step 604). In this step, the controller 108 (or its component) may also set the ISGE index.

The controller 108 (or its component) may then issue a read request with the start LBA and number of blocks to the drive (step 608). Thereafter, when the drive is ready to copy the data, the controller will check the ISGL 224 for skips, BS, and filler types (step 612). These various types of ISGEs may be checked by the controller 108 in any order. The depicted order of operations should not be construed as limiting embodiments of the present disclosure to a particular order of operations.

In some embodiments, the controller 108 begins the checking process by obtaining the next ISGE 228 from the ISGL 224 (step 616) and then determining if the ISGE is a buffer type ISGE (step 620). If the ISGE 228 is determined to be a buffer type ISGE, then the method continues with the controller 108 (or its component) determining if the LMID is a READ_ALL or READ_BS type of LMID 404 (as indicated within the opcode). If neither condition is true, then the method returns to step 616. If either one of these conditions is true (e.g., the opcode indicates a READ_ALL or READ_BS), then the method proceeds with the controller 108 getting the buffer address of the BS or filler buffer segment (step 628). With this information, the controller continues by getting the buffer address of the host buffer for the present offset (step 632). Then the controller 108 (or its component) transfers this data for the BS or filler buffer segment (step 636). The transfer of data may be provided back to the requesting host system 104 as an example. In other embodiments, the transferred data may be provided to another component within the controller 108. Thereafter, the method ends 640.

Referring back to step 620, if the ISGE 228 is not of a buffer type, the method proceeds with the controller determining if the ISGE 228 is of a filler type (step 644). If this query is answered positively, then the controller 108 determines if the ISGE 228/LMID 404 is a READ_ALL or READ_FILLER command. If this query is found to be true, then the method proceeds to step 628. If the query of step 648 is found to be untrue, then the method proceeds to step 660 where it is determined if all of the blocks have been processed. If the query of step 660 is answered positively, then the method ends 640. If the query of step 660 is answered negatively, then the method returns back to step 616.

Referring back to step 644, if the ISGE 228 is not determined to be a filler type, then the method proceeds with the controller 108 determining if the ISGE 228 is a skip type (Step 652). If the ISGE 228 is determined to be a skip type, then the method proceeds with the controller 108 adjusting the next host buffer address and the number of blocks processed (step 656). This update and adjustment may be maintained within the LMID 404. The method then returns back to step 616. If the query of step 652 is answered negatively, then the method proceeds to step 660. Once all blocks have been processed, the method ends at step 640.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A caching method, comprising:
receiving a host command from a host;
extracting command information from the host command;
determining an Input/Output (I/O) action to be taken in connection with the host command;
identifying a particular memory module from among a plurality of memory modules to execute the I/O action;

generating an accelerated I/O message for transmission to the particular memory module, the accelerated I/O message comprising at least one Internal Scatter Gather List (ISGL) having a plurality of Scatter Gather Extents (SGEs) that enable the particular memory module to execute the I/O action solely based on the at least one ISGL, the SGEs including a skip flag indicating whether an associated SGE should be skipped, the accelerated I/O message including a skip count indicating a number of blocks to be skipped when the skip flag is encountered; and transmitting the accelerated I/O message to the particular memory module.

2. The caching method of claim 1, wherein the host command comprises a write command.

3. The caching method of claim 2, wherein the particular memory module comprises a buffer memory module that receives the accelerated I/O message and executes at least some I/O actions consistent with the SGEs contained in the accelerated I/O message.

4. The caching method of claim 3, further comprising:
allocating the at least one ISGL;
allocating buffer memory to execution of the at least some I/O actions and allocating the allocated buffer memory to the at least one ISGL with a first count;
determining whether the first count has reached an end of the at least one ISGL; and
performing one of the following:
 in the event that the end of the at least one ISGL has not been reached, determining whether or not all memory blocks from the allocated buffer memory have been allocated; or
 in the event that the end of the at least one ISGL has been reached, allocating a new ISGL, copying a last of the SGEs into a first location of the new ISGL, and adding a chain of SGEs to a last SGE in the at least one ISGL.

5. The caching method of claim 1, wherein the host command comprises a read command.

6. The caching method of claim 5, wherein the particular memory modules comprises a cache memory module that receives the accelerated I/O message and executes at least some I/O actions consistent with the SGEs contained in the accelerated I/O message.

7. The caching method of claim 6, further comprising:
loading the at least one ISGL into local memory;
obtaining a next SGE from the at least one ISGL;
determining that the next SGE indicates a chain of SGEs exists; and
obtaining another SGE from the at least one ISGL after the at least one ISGL has been loaded into the local memory.

8. The caching method of claim 1, wherein the at least one ISGL is a chain of ISGLs.

9. The caching method of claim 1, wherein the host command comprises at least one of a flush command and a cache update command.

10. The caching method of claim 1, wherein each of the plurality of SGEs comprise a Block Segment Identifier (BSID) and a flag that identifies whether the at least one ISGL comprises a chain of ISGLs.

11. The caching method of claim 1, wherein the accelerated I/O message comprises an offset arm field and a strip/stripe number field that identifies whether the data in the host command requires a strip or stripe of memory.

12. A memory control system, comprising:
a processor; and
a computer-readable medium coupled to the processor, the computer-readable medium comprising processor-executable instructions that include:
 instructions to receive a host command from a host;
 instructions to extract command information from the host command;
 instructions to determine an Input/Output (I/O) action to be taken in connection with the host command;
 instructions to identify a particular memory module from among a plurality of memory modules to execute the I/O action;
 instructions to generate an accelerated I/O message for transmission to the particular memory module, the accelerated I/O message comprising at least one Internal Scatter Gather List (ISGL) having a plurality of Scatter Gather Extents (SGEs) that enable the particular memory module to execute the I/O action solely based on the at least one ISGL, the SGEs including a skip flag indicating whether an associated SGE should be skipped, the accelerated I/O message including a skip count indicating a number of blocks to be skipped when the skip flag is encountered; and
 instructions to transmit the accelerated I/O message to the particular memory module.

13. The memory control system of claim 12, wherein the host command comprises a write command.

14. The memory control system of claim 13, wherein the particular memory module comprises a buffer memory module that receives the accelerated I/O message and executes at least some I/O actions consistent with the SGEs contained in the accelerated I/O message.

15. The memory control system of claim 14, wherein the instructions further comprise:
instructions that allocate the at least one ISGL;
instructions that allocate buffer memory to execution of the at least some I/O actions and that allocate the allocated buffer memory to the at least one ISGL with a first count;
instructions that determine whether the first count has reached an end of the at least one ISGL; and
instructions that cause one of the following to be performed:
 in the event that the end of the at least one ISGL has not been reached, determining whether or not all memory blocks from the allocated buffer memory have been allocated; or
 in the event that the end of the at least one ISGL has been reached, allocating a new ISGL, coping a last of the SGEs into a first location of the new ISGL, and adding a chain of SGEs to a last SGE in the at least one ISGL.

16. The memory control system of claim 12, wherein the host command comprises a read command.

17. The memory control system of claim 16, wherein the particular memory modules comprises a cache memory module that receives the accelerated I/O message and executes at least some I/O actions consistent with the SGEs contained in the accelerated I/O message.

18. The memory control system of claim 12, wherein the at least one ISGL is a chain of ISGLs.

19. The memory control system of claim 12, wherein the host command comprises at least one of a flush command and a cache update command.

20. A computing system, comprising:
a plurality of memory modules, each being configured to execute different Input/Output (I/O) actions; and a controller that:
receives a host command from a host, extracts command information from the host command, determines an Input/Output (I/O) action to be taken in connection with the host command;
identifies a particular memory module from among the plurality of memory modules to execute the I/O action;
generates an accelerated I/O message for transmission to the particular memory module, the accelerated I/O message comprising at least one Internal Scatter Gather List (ISGL) having a plurality of Scatter Gather Extents (SGEs) that enable the particular memory module to execute the I/O action solely based on the at least one ISGL, the SGEs including a skip flag indicating whether an associated SGE should be skipped, the accelerated I/O message including a skip count indicating a number of blocks to be skipped when the skip flag is encountered; and
transmits the accelerated I/O message to the particular memory module.

\* \* \* \* \*